Figure 1:
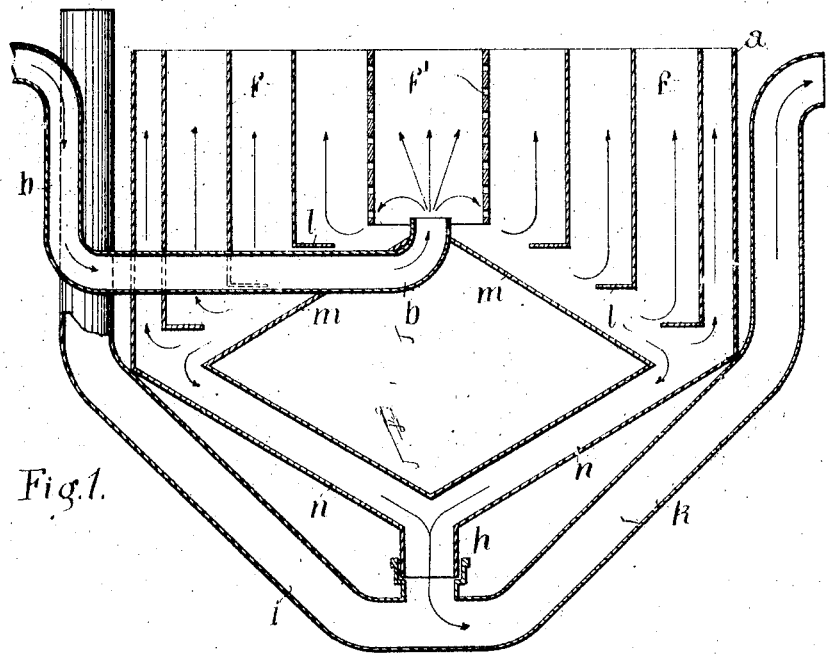

R. SCHILLING.
APPARATUS FOR SEPARATING FLOATING MATTER FROM EFFLUENTS.
APPLICATION FILED DEC. 10, 1909.

1,057,174.

Patented Mar. 25, 1913.

Witnesses:
James P. Mansfield
L. E. Witham

Inventor:
Rudolf Schilling
By:
Alexander & Dowell
Attorneys

UNITED STATES PATENT OFFICE.

RUDOLF SCHILLING, OF SCHÖNEBERG, NEAR BERLIN, GERMANY.

APPARATUS FOR SEPARATING FLOATING MATTER FROM EFFLUENTS.

1,057,174.  Specification of Letters Patent.  Patented Mar. 25, 1913.

Application filed December 10, 1909. Serial No. 532,345.

*To all whom it may concern:*

Be it known that I, RUDOLF SCHILLING, a subject of the German Emperor, and residing at Schöneberg, near Berlin, Germany, have invented certain new and useful Improvements in Apparatus for Separating Floating Matter from Effluents, of which the following is a specification.

My invention relates to devices for separating suspended matter from waste water or effluents.

In order to permit suspended matter in waste waters to be separated therefrom in the form of a floating layer, the current velocity of the waste waters has been slackened by using devices by which the waste waters were supplied into special tanks from which the water was conducted away either laterally or above the same. It has also been proposed to attain the same end by using clarifying tanks provided with partitions. In these systems, however, it was not possible to avoid separating the heavy substances beneath the floating layer and depositing them in the same tank. By thus simultaneously separating out the suspended matter and the heavy substances, there resulted on the one hand the important disadvantage that products of fermentation might rise up from the heavy substances and thus mix with and pollute the floating layer, whereas the removal of the sediment at the bottom is much too costly in comparison with the profits resulting from the utilization of the floating matter, particularly in cases when the plant is specially for admitting of the floating matter being utilized, for example when collecting fatty substances. In plants of the kind described the sediment was removed either by providing special slime buckets, which were removed and emptied from time to time, or by providing special stripping devices, which removed the deposits into an adjacent tank; when using clarifying tanks, in order to facilitate the work these tanks were intermittently cut off for the purpose of removing the sediment, slime buckets being also employed from which the sediment was removed by suction. As compared with these devices known heretofore in which a floating layer was produced and other matter settled at the bottom and had to be removed by special means, in the apparatus according to my invention only the floating matter is separated out, whereas the heavy matter or sediment is removed directly by the water as it flows away. To this end, I produce a floating layer by slackening the current velocity of the water in known manner, whereas for the precipitated substances or sediment I obtain such rapid currents that these heavy substances can no longer be deposited on the bottom but are exposed to the action of these rapid currents. I obtain the necessary slackening of the current velocity of the water so as to admit of a floating layer being produced by conducting the liquid in known manner into a tank, the cross-section of which is considerably larger than that of the water supply pipe. The current of water can be still further checked by inserting special walls situated concentrically to the inlet of the water. These walls at the same time form adhesion surfaces, on which the floating matter, more particularly the fat, can accumulate and rise to the top. I obtain the current for conducting away the heavy matter together with the waste waters from which the floating matter has been separated by transforming the static pressure of the still liquid carrying the floating layer into current energy by considerably constricting the cross-section.

I will now describe my invention with reference to the accompanying drawing showing one illustrative embodiment thereof.

Figure 2:
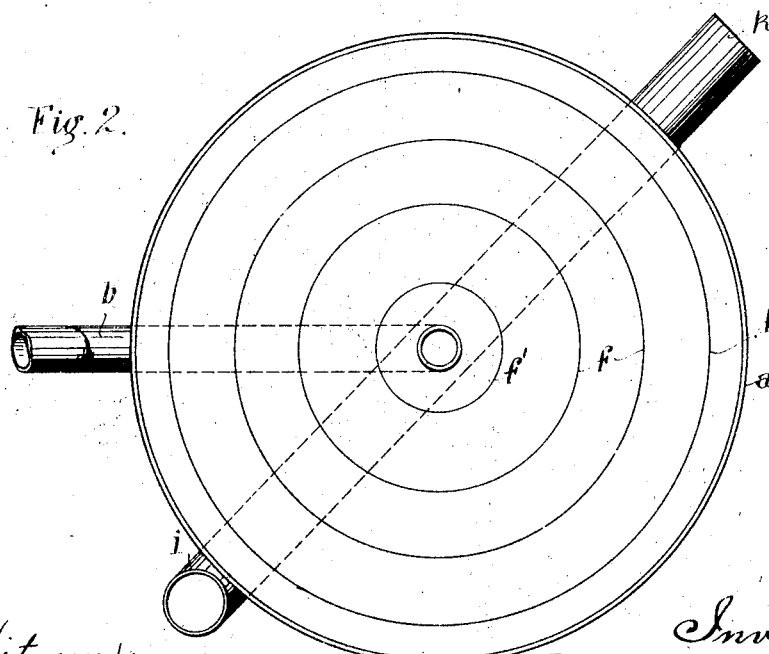

In said drawing: Figure 1 shows a longitudinal section through my apparatus, and Fig. 2 is a plan view of the same.

In the illustrative embodiment the floating matter is separated in the upper part of a tank *a*, the bottom portion of which is funnel-shaped. The waste waters are introduced in the direction of the arrows into tank *a* through the curved conduit *b* and are discharged into the center of the tank.

The upper portion of tank *a* is cylindrical and is provided with a number of concentric walls *f*. The lengths of these walls increase from the center to the periphery of the tank, so that the bottom edge of each outer wall is somewhat lower than that of the adjacent inner wall. Furthermore the lower ends of the walls $f$ are preferably provided with horizontal inwardly projecting flanges $l$, for the purpose of keeping the fatty particles and the like collecting on the walls safely beyond the action of the current below the edges of the wall. The innermost circular wall $f'$ does not act as collecting chamber for the suspended matter because the current velocity in the same is too high; this innermost cylinder $f'$ may be perforated, if desired, as shown.

For conducting away the waste waters and the heavy matter, I provide a double cone $m$, the lower part of which forms with the bottom part of tank $a$ a constricted channel $n$, by means of which the necessary reduction of cross-section for the purpose of producing a strong discharge current is obtained.

Two sloping, upwardly-projecting pipes $i$, $k$ are fitted to the outlet pipe $h$ of tank $a$. Pipe $k$ serves for conducting away the waste waters carrying along the heavy matter with them; the upper end of this pipe should not be at a higher level than the supply channel $b$. The other pipe $i$ merely serves for cleaning purposes so as to be able to remove any stoppages in the pipe $k$ by means of a cleaning device. The upper end of the cleaning pipe $i$ must be situated higher than pipe $b$. Owing to the arrangement of pipe $i$ no special valve or closure member is necessary beneath pipe $h$ and owing to my construction no special shaft is required for gaining access to such closure member.

I claim:—

1. In apparatus for separating floating matter from effluents, the combination of a cylindrical tank having a downwardly-directed, conical lower part having an outlet, a central, cylindrical, perforated wall in the upper portion of said tank, a plurality of concentric walls having inwardly-directed flanges at the bottom ends thereof arranged around said central wall, each outer flanged wall being longer than the next inner wall, a supply pipe opening upwardly into said central wall, a double conical, constricting member arranged between the inner end of said pipe and said outlet, a discharge pipe connected with said outlet, and a pipe connected with the discharge pipe and opening above the level of said supply pipe.

2. In an apparatus for separating floating matter from effluents, the combination of a tank having a funnel-shaped lower part, with a contracted outlet opening at the bottom of said constricted part, an upwardly directed inlet opening in the upper part of the tank above the contracted lower part thereof, a deflecting and constricting member arranged in the tank between the inlet and outlet whereby current velocity of the effluent is diminished above said member and increased around and below said member, and a plurality of concentric walls having inwardly directed flanges at their lower ends arranged in the upper part of the tank around the inlet opening.

3. Apparatus for separating floating matter from effluents, comprising a receptacle having an upper part of large cross section and a contracted lower part, with an open and unrestricted outlet at the terminal of the contracted portion, and a conduit leading from said outlet to a point near the top of the apparatus to maintain the water level in the apparatus, and an inlet above the contracted portion whereby the current velocity of the effluent discharged into the receptacle is so diminished in the upper part thereof that a floating top layer can form in the fluid therein while the effluent is continuously discharged with sufficient velocity at the outlet to prevent heavy matters settling in the receptacle.

4. Apparatus for separating floating matter from effluents, comprising a tank having a conical lower part, with an unrestricted outlet at its bottom, and a conduit leading from said outlet to a point near the top of the apparatus to maintain the water level in the apparatus, and an inlet in the upper part of the tank; with a deflecting and constricting member arranged in the tank between the inlet and outlet whereby the current velocity of the effluent is diminished above said member and increased below said member the outflow being continuous thus preventing heavy matter contained in said effluent from settling in the tank.

5. Apparatus for separating floating matter from effluents, comprising a tank having a contracted lower part, with an outlet at its bottom, and a pipe communicating with said opening and leading to a point above the lower part to maintain the water level in the apparatus; an upwardly directed supply pipe entering the upper part of the tank above the contracted lower part thereof, and a plurality of concentric walls arranged in the upper portion of the tank around said inlet whereby the velocity of the effluent is diminished in the upper part of the tank but increased in the constricted part thereof thus permitting a continuous outflow of fluid and preventing heavy matters from settling in the tank.

6. In an apparatus for separating floating matter from effluents, the combination of a tank having a conical lower part with an unrestricted opening at its bottom, and a pipe communicating with said opening and leading to a point above the lower part to maintain the water level in the apparatus; an inlet pipe in the upper part of the tank above the conical lower part thereof, a plurality of concentric walls arranged in the upper part of the tank around the inlet pipe, a deflecting and constricting member arranged in the lower part of the tank between the inlet and outlet, whereby current velocity of the effluent is diminished above said member and increased around and below said member, thus permitting a continuous outflow of fluid and preventing heavy matters contained in said effluent from settling in the tank.

In testimony whereof, I affix my signature in the presence of two witnesses.

RUDOLF SCHILLING.

Witnesses:
  HENRY HASPER,
  WOLDEMAR HAUPT.